(No Model.)

J. W. TODD.
SAW TOOTH.

No. 481,836.    Patented Aug. 30, 1892.

WITNESSES:
W. M. Turtchell
C. Sedgwick

INVENTOR:
J. W. Todd
BY Munn & Co
ATTORNEYS

UNITED STATES PATENT OFFICE.

JOHN WILLIAM TODD, OF PORTLAND, OREGON.

SAW-TOOTH.

SPECIFICATION forming part of Letters Patent No. 481,836, dated August 30, 1892.

Application filed April 2, 1892. Serial No. 427,447. (No model.)

*To all whom it may concern:*

Be it known that I, JOHN WILLIAM TODD, of Portland, in the county of Multnomah and State of Oregon, have invented a new and Improved Saw-Tooth, of which the following is a full, clear, and exact description.

The object of the invention is to provide a new and improved saw-tooth especially designed for circular saws, and which is simple and durable in construction and arranged for convenient insertion on the saw-blade or removal therefrom for sharpening or other purposes.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1:
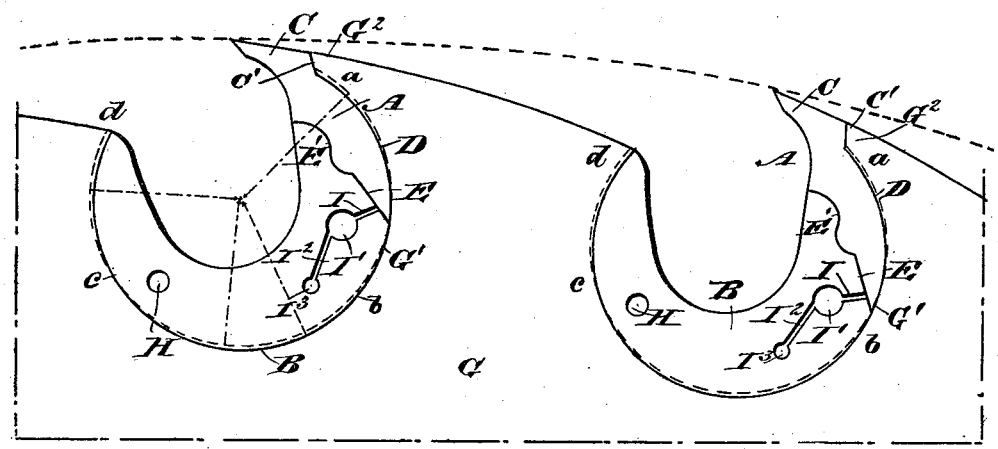
Figure 2:
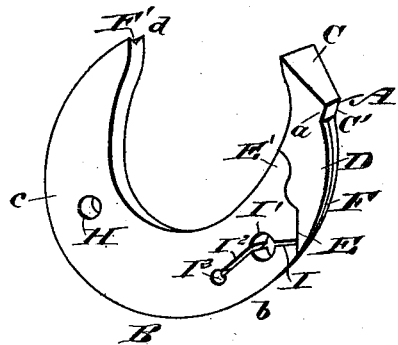

Figure 1 is a side elevation of the improvement as applied, and Fig. 2 is a perspective view of the tooth.

The improved saw-tooth is made of two parts, a point A and a shank B, of which the former is provided with the cutting-point C and the body part D, of the same thickness as the saw-blade on which the tooth is applied. The point A is jointed to the shank B, the joint being formed partly straight, as at E, and the remainder in S shape, as at E', as is plainly shown in the drawings. On the back of the sharp edge C of the point A is formed a shoulder C', and the outer edge of the body part D of the said point, as well as that of the shank B, is formed with a V-shaped groove F, fitting into a V-shaped curved ridge G', formed in the saw-blade G, on which the tooth is applied. The shoulder C', previously mentioned, abuts against a projection G², formed on the saw-blade near the periphery of the same, as will be readily understood by reference to Fig. 1.

In the shank B is formed a transverse aperture H, and at the joint E is arranged a transverse slot I, leading into a transverse aperture I', from which extends a transverse slot I², leading into an aperture I³. The slots I and I² stand at angles to each other, as is plainly shown in the drawings, the said slots serving to permit of fitting the shank onto the ridge G' of the saw-blade G. The ridge G' in the saw-blade G is formed from the projection G² at $a$ to $d$ as a segment of a circle, while the outside line of the shank B is a true circle only from $b$ to $c$, and a like true circle from $a$ to $b$ and from $c$ to $d$, the several circles having the same radius; but their centers are changed, so as to widen the bit or point A and shank B at points $a$ and $d$. The change of position of the centers of the circles causes the shank B to press hard against the point A at the joint E. The centers of the circles are placed suitable distances apart, so that when the shank and bit are placed in position on the ridge G' a pressure is obtained against that part of the shank B containing the slots I I² and apertures I' I³, whereby a pressure is exerted against the body part D of the point A, so as to hold the latter in place. It is understood that the slots I I² and apertures I' I³ form springs in the ends of the shank B adjacent to the point A, and this spring part of the shank exerts a pressure on the point A at the joint E E', so as to fasten the point A in place. By making part of the joint S-shaped, as at E', considerable bearing-surface is obtained between the point A and shank B to prevent the latter from becoming loose in the saw-blade G.

Having thus described my invention, I claim as new and desire to secure by Letters Patent—

1. A saw-tooth provided with a shank and a point seated in the saw-blade and having their outer edges formed partly on a segment of a different circle than the seat in the saw-blade, substantially as shown and described.

2. A saw-tooth provided with a shank and a point seated in the saw-blade and having their outer edges formed partly on a segment of a different circle than the seat in the saw-blade, the end of the shank adjacent to the point being provided with a spring part pressing on the point to hold the latter on its seat, substantially as shown and described.

3. An insertible saw-tooth comprising a shank and a separable point fitted one on the other, the joint being partly straight and partly S-shaped, the outer edges of the said shank and point being partly formed on a segment of a different circle than the seat in the saw-blade, substantially as shown and described.

JOHN WILLIAM TODD.

Witnesses:
JOHN CANDLISH,
M. F. HENDERSON.